United States Patent [19]
Johnson

[11] Patent Number: 6,099,889
[45] Date of Patent: Aug. 8, 2000

[54] FRUIT AND VEGETABLE JUICE BEVERAGE AND PROCESS OF MAKING

[76] Inventor: Earl L. Johnson, 501 N. Park Dr. #7, Arlington, Va. 22203

[21] Appl. No.: 08/382,588

[22] Filed: Feb. 2, 1995

[51] Int. Cl.⁷ .................................. A23L 2/02; A23L 2/40
[52] U.S. Cl. ........................ 426/599; 426/330.5; 426/654
[58] Field of Search ................................. 426/330.5, 599, 426/654

[56] References Cited

U.S. PATENT DOCUMENTS

| | | |
|---|---|---|
| 1,208,859 | 12/1916 | Takamine et al. . |
| 2,197,095 | 4/1940 | Cuenod . |
| 2,206,319 | 7/1940 | Geitz, Jr. . |
| 2,378,533 | 6/1945 | Bering . |
| 2,450,456 | 10/1948 | St. Clair . |
| 2,497,035 | 2/1950 | Seeder . |
| 3,025,164 | 3/1962 | Metzger . |
| 3,243,347 | 3/1966 | Kracauer . |
| 3,366,490 | 1/1968 | Wagner et al. . |
| 4,163,807 | 8/1979 | Jackman . |
| 4,187,322 | 2/1980 | Josse et al. . |
| 4,293,580 | 10/1981 | Rubenstein . |
| 4,486,413 | 12/1984 | Wiesenberger et al. . |
| 4,609,561 | 9/1986 | Wade et al. . |
| 4,737,367 | 4/1988 | Langer et al. . |
| 4,971,824 | 11/1990 | Jonas . |
| 4,988,530 | 1/1991 | Hoersten et al. . |
| 4,992,282 | 2/1991 | Mehansho et al. . |

OTHER PUBLICATIONS

Nagy et al, 1977, Citrus Science and Technology, vol. 2, Avi Publishing Co., Westport, CN, p. 246.

Hawley, G. 1984, The Condensed Chemical Dictionary, 10 Ed, Van Nostrand Reinhold Co. p. 854.

*The Tomato Book,* by Yvonne Young Tarr, Random House, Inc., Mar. 1977, pp. 142–143.

*Primary Examiner*—Helen Pratt
*Attorney, Agent, or Firm*—Penrose Lucas Albright

[57] ABSTRACT

A beverage composed essentially of orange juice from concentrate and tomato juice from concentrate in approximately equal portions, 60 to 1200 milligrams of ascorbic acid added to the mixture together with a food additive preservative substance comprising about 0.025% sodium benzoate and about 0.025% potassium sorbate.

12 Claims, No Drawings

FRUIT AND VEGETABLE JUICE BEVERAGE AND PROCESS OF MAKING

FIELD OF THE INVENTION

This invention relates to a combination of fruit and vegetable juice products to form a beverage of new composition having a distinctive taste. More particularly, it relates to a combination which includes a mixture of tomato juice and orange juice, both from concentrate, to form a beverage having novel flavor and taste characteristics.

BACKGROUND OF THE INVENTION

The number of essentially pure fruit and vegetable juices, including juices which are prepared from concentrates, currently available in most grocery stores are limited when compared to the myriad and variety of fresh and canned fruits and vegetables available to consumers. Thus to increase the choices available to consumers, many fruit mixtures and blends have been placed on the market wherein high-fructose and corn syrup are the primary constituents. These have no counterparts in the fruit and vegetable domain. They are identified by product designations such as "punch," "cocktail," "thirst quencher," "beverage," "drink" and so forth. Unfortunately many of these beverages are essentially a combination of sugar, water and artificial flavorings, wherein the juice content is minimal. Although it is not uncommon for such beverages to be "enriched" with a variety of vitamins and minerals as therapeutic supplements to make them more nearly equivalent to a healthful drink, they do not have the same nutrient profiles as the original juices.

Accordingly, it will be appreciated that a problem exists due to the limited number of vegetable and fruit juices which are currently available in quantities adequate for the mass-market and, at the same time, attractive to a sufficiently large portion of the purchasing public, and further which have not been diluted with water, or have sugar or other added flavoring added to make them more palatable. The problem is aggravated inasmuch as some people are allergic to citrus products, which substantially limits the fruit juices available to them in the marketplace. There is also a significant portion of the population who suffer from diabetes and therefore should avoid products wherein various types of sugars have been added. This is not to represent that a variety of fruit and vegetable juices in their pure form are not commercially available to those who seek them. However, because their taste may be tart or otherwise sharp, such as, for example, pure cranberry juice, they are often available only in health food stores, or limited quantities may be available at more popular grocery stores in health food sections. Nevertheless, in large supermarkets, the need to provide foods to the public at attractive prices lead them to use their limited shelf space for varieties of vegetable and fruit juices for which there is a substantial demand. The result is a "Catch-22" situation because, unfortunately, agriculturalists are unlikely to establish orchards and vineyards, or otherwise plant and cultivate crops for the production of juices for which an adequate market does not exist. This has influenced the food industry to create new drinks which are mixtures of ingredients such as high fructose, corn syrup and flavors with minimal fruit context, and which do not require an existing agricultural base. The ultimate result has been that a major portion of supermarket shelf space for fruit and vegetable juices is devoted to beverages as described above which are essentially mixtures of high fructose, corn syrup, water and flavors.

There is thus a need for a greater variety of fruit and/or vegetable juice beverages which, at the same time, are wholesome, can be readily produced, have a pleasing flavors, and are satisfying, without the need to create an agricultural and production base that does not presently exist.

SUMMARY OF THE INVENTION

The present invention is directed to a naturally wholesome beverage mixture that is provided in sealed containers, and includes approximately equal parts of citrus juice and vegetable juice. Both the citrus and the vegetable juices are derived from concentrate. The beverage mixture typically includes preservatives comprising $1/40$ of 1% of sodium benzoate, and $1/40$ of 1% of potassium sorbate. Although "enrichment" is not considered necessary, approximately 100% to 2000% of the Recommended Daily Allowance of vitamin C may also advantageously be included in the beverage mixture.

It has been discovered that when the citrus juice component of the beverage mixture is orange juice derived from concentrate, and the vegetable juice component of the beverage mixture is tomato juice derived from concentrate, the resulting beverage produced has a surprisingly refreshing and pleasant taste.

The remarkable taste of the healthful juice beverage in accordance with the present invention is contrary to expectations of how such a combination should taste. Although it would be expected that either the tomato flavor or the orange flavor would dominate, such is not the case and the taste is different than either.

Another object of the present invention is to provide a kit including one container having an orange beverage from concentrate therein, another container having tomato juice from concentrate therein, or alternatively, a container having a mixture of orange and tomato concentrates, and a further container having an effervescent mineral water. When the effervescent mineral water is added to the mixture of concentrates, a carbonated beverage results, which provides a unique sales and marketing feature.

DESCRIPTION OF THE PREFERRED EMBODIMENT

It has been found that when approximately equal parts of a orange juice from concentrate and a tomato juice from concentrate are mixed together, a remarkably delightful beverage is produced. The resulting combination of the orange juice and the tomato juice produces a pleasant tasting beverage that is distinctive from either of the ingredients.

Whereas typically the orange and the tomato juice components are provided in equal parts, they may be varied so that the ratio of one component to the other may be one to three at the most without entirely losing the distinctive taste. However, preferably, to ensure a unique taste of the new beverage in accordance with the invention without either the orange juice taste or the tomato juice taste predominating, the ratio should normally fall within a two to three ratio. Preservatives may, and normally should, also be added to the beverage. For the invention, preferably the preservative consists of about $1/40$th of 1% of sodium benzoate, and about $1/40$th of 1% of potassium sorbate. Vitamin C, also a preservative, may also be advantageously included in the preferred embodiment in the range of 100% to 2000% of the Recommended Daily Dietary Allowance.

It has been found to achieve its distinctive taste, that the beverage in accordance with the invention must be composed of a mixture of orange juice from concentrate and tomato juice from concentrate. To produce the mixture, the concentrates of these juices are each mixed with water in prescribed amounts to form separately "orange juice from concentrate" and "tomato juice from concentrate," and the resulting mixture is then further mixed together to provide a unique beverage in accordance with the invention. Alternatively, the concentrates, as such, may be mixed together, and then water, again in a prescribed amount, about three parts water to one part mixed concentrates, is added to produce the beverage. At the same time, vitamin C as ascorbic acid is added in amounts of about 60 to 1,200 milligrams per liter of the product. The preservatives may be anti-oxidants or benzoate acid in approved food additive forms, but preferably they consist of 0.025% sodium benzoate and 0.025% potassium sorbate by weight. They are added and mixed well into the mixture, irrespective of whether the mixture is the juices, as such, or is a mixture of the concentrates. The product is preferably vacuum-deaerated and homogenized as necessary, and may be marketed in metal or glass containers. The entire process is carried out by sanitized machinery under sanitary conditions, and the beverage is sterilized by known processes, including "in can" processing, the temperature not being sufficiently increased, however, to reduce to any significant extent the nutritive value of the product. It will also be appreciated that the concentrate mixture, as such, can be, and preferably is, placed in containers which are transported and marketed as frozen goods. Desirably, but not necessarily, depending upon the preservative added, the beverage product is transported and marketed under refrigerated conditions not less than about 35° F.

As used in the specification and claims, the terms "tomato juice from concentrate" and "orange juice from concentrate," refer to products which conform to current governmental standardized definitions of such juices. "Orange juice from concentrate" is thus described in Title 21, Code of Federal Regulations, Section 146.145. It is preferably 100% juice wherein sweetening ingredients have not been added. "Tomato juice from concentrate" is described in Title 21, Section 156.145. It should be of at least standard quality. These definitions are incorporated by reference.

Producing the beverage from a mixture of orange juice from concentrate and tomato juice from concentrate has been found critical to arrive at the product's unique taste. Moreover, if the mixture is less than 40% of one juice, and more than 60% of the other juice, its taste is altered so that it tends to take on the flavor of the predominant juice, rather than the unique flavor of the invention, which is neither the flavor of orange juice nor tomato juice, but something different.

The invention thus provides a new and novel beverage produced from two wholesome juices which are widely available to beverage manufacturers. In this sense, it is distinctive from known multijuice beverages which contain small amounts of juice for flavor and primarily sweetness such as high fructose and corn syrup, and from juices that have distinctive flavors and are wholesome, but that lack an adequate agricultural base for large scale production and marketing efforts.

The orange and tomato concentrates, either mixed together or separate, may be further mixed in a ratio of about 1 to 3 with a natural or artificially produced mineral water which is effervescent or with soda water. The combination, marketed as a kit, provides a delightful effervescent drink when the constituents are mixed together. Again, there should be approximately equal portions of the orange and tomato juice concentrates for this purpose and the ratio of concentrates to water is about one to three.

Although I have described the preferred embodiments of my invention, it is to be understood that it is capable of other adaptations and modifications within the scope of the appended claims.

Having disclosed my invention, what I claim as new and to be secured by Letters Patent of the United States is:

1. A beverage for human consumption consisting essentially of about 40% to 60% by volume of orange juice made from concentrate, about 40% to 60% by volume of tomato juice made from concentrate, 60 to 1,200 milligrams of ascorbic acid per liter of the beverage, and sufficient food additive preservative substances to prevent spoilage of the beverage after it has been sterilized while in sealed sterile containers.

2. A beverage in accordance with claim 1, wherein said food additive preservative comprises by weight of the beverage about 0.025%سodium benzoate and about 0.025% potassium sorbate.

3. A beverage in accordance with claim 1, wherein the volume of said orange juice from concentrate is about 50%, and the volume of said tomato juice from concentrate is about 50%.

4. A beverage suitable for human consumption which consists essentially of about 40% to 60% by volume orange juice made from concentrate, and the remainder comprising tomato juice made from concentrate, sufficient food additive preservative substance to prevent spoilage of the beverage, and about 60 to 1200 milligrams of ascorbic acid per liter of the beverage.

5. A beverage in accordance with claim 4, wherein said food additive preservative substance comprises by weight of the beverage about 0.025% sodium benzoate and about 0.025% potassium sorbate.

6. A frozen concentrate for making a beverage suitable for human consumption which consists essentially of a mixture of about equal parts by volume of tomato juice concentrate and orange juice concentrate, from about 60 to 1200 milligrams of ascorbic acid per liter of beverage to be produced from the mixture, and sufficient food additive preservative substance to prevent spoilage of the mixture while shipped, marketed and stored in a frozen condition.

7. A frozen concentrate in accordance with claim 6, which is in a container and is directly associated and in combination with a bottle of effervescent mineral water of a sufficient quantity so that when added to said mixture, a beverage is produced that is the equivalent of about equal amounts of orange juice from concentrate and tomato juice from concentrate which effervesces.

8. A method of producing a beverage suitable for human consumption that has a distinctive taste, which consists essentially of the steps of producing a mixture of orange juice from concentrate and tomato juice from concentrate in approximately equal portions by volume by adding to the concentrates to be used for producing said orange juice and said tomato juice water in a quantity which is approximately three times the total quantity of said concentrates.

9. A method in accordance with claim 8, wherein said water consists of an effervescent natural mineral water.

10. A method in accordance with claim 8, wherein said water consists of an effervescent artificial mineral water.

11. A method in accordance with claim 8, wherein said water consists of soda water.

12. A beverage for human consumption consisting essentially of approximately 50% by volume of orange juice which is reconstituted with water from an orange juice concentrate and approximately 50% by volume of tomato juice which is reconstituted with water from a tomato juice concentrate, and sufficient food preservative to prevent spoilage of the beverage after it has been sterilized while in sealed sterile containers.

* * * * *